(12) United States Patent
Nishio et al.

(10) Patent No.: US 8,980,070 B2
(45) Date of Patent: Mar. 17, 2015

(54) BIPOLAR MEMBRANE AND METHOD OF MANUFACTURING THE SAME

(75) Inventors: Kazunori Nishio, Shunan (JP); Kazuo Mizuguchi, Shunan (JP); Minoru Kawashima, Shunan (JP); Toshio Aritomi, Shunan (JP)

(73) Assignee: Astom Corporation, Tokyo (JP)

( * ) Notice: Subject to any disclaimer, the term of this patent is extended or adjusted under 35 U.S.C. 154(b) by 755 days.

(21) Appl. No.: 13/133,349

(22) PCT Filed: Dec. 7, 2009

(86) PCT No.: PCT/JP2009/070477
§ 371 (c)(1),
(2), (4) Date: Jun. 7, 2011

(87) PCT Pub. No.: WO2010/067775
PCT Pub. Date: Jun. 17, 2010

(65) Prior Publication Data
US 2011/0240463 A1    Oct. 6, 2011

(30) Foreign Application Priority Data
Dec. 8, 2008   (JP) ................................. 2008-312023

(51) Int. Cl.
| | | |
|---|---|---|
| *B01D 61/48* | (2006.01) | |
| *B01D 61/44* | (2006.01) | |
| *B01D 69/10* | (2006.01) | |
| *B01D 71/26* | (2006.01) | |
| *C08J 5/22* | (2006.01) | |

(52) U.S. Cl.
CPC .............. *B01D 61/445* (2013.01); *B01D 69/10* (2013.01); *B01D 71/26* (2013.01); *C08J 5/2275* (2013.01); *B01D 2325/14* (2013.01); *B01D 2325/16* (2013.01); *C08J 2327/08* (2013.01)
USPC ......................................... 204/296; 204/631

(58) Field of Classification Search
USPC ................................................. 204/296, 631
See application file for complete search history.

(56) References Cited

U.S. PATENT DOCUMENTS

| | | | |
|---|---|---|---|
| 3,242,106 A | * | 3/1966 | Kressman ........................ 521/27 |
| 4,253,900 A | * | 3/1981 | Dege et al. ................. 156/309.3 |
| 4,806,219 A | | 2/1989 | Yamamoto et al. |
| 5,221,455 A | | 6/1993 | Hanada et al. |

FOREIGN PATENT DOCUMENTS

| | | |
|---|---|---|
| JP | 32-3962 B | 6/1932 |
| JP | 34-3961 B | 5/1934 |
| JP | 35-014531 B | 10/1935 |
| JP | 38-016633 B | 9/1938 |
| JP | 51-41113 B | 11/1976 |
| JP | 54-94485 A | 7/1979 |
| JP | 54-117384 A | 9/1979 |
| JP | 55-41804 A | 3/1980 |
| JP | 60-144336 A | 7/1985 |
| JP | 4-228591 A | 8/1992 |
| JP | 7-222915 A | 8/1995 |
| JP | 7-258878 A | 10/1995 |
| JP | 2003-26830 A | 1/2003 |

OTHER PUBLICATIONS

Extended Europrean Search Report issued on Apr. 8, 2014 in European Patent Application No. 09831879.3.
Bauer et al., "Development of Bipolar Membrane", Desalination, vol. 68, 1988, pp. 279-292.
Chiao et al. "Biopolar membranes for purification of acids and bases", Journal of Membrane Science, vol. 61, 1991, pp. 239-252.
International Search Report, PCT/JP2009/070477, Feb. 9, 2010.
Simons., "Preparation of a high performance bipolar membrane", Journal of Membrane Science, vol. 78, 1993, pp. 13-23.

* cited by examiner

*Primary Examiner* — Arun S Phasge
(74) *Attorney, Agent, or Firm* — Birch, Stewart, Kolasch & Birch, LLP

(57) ABSTRACT

To provide a bipolar membrane featuring improved adhesion between an anion-exchange membrane and a cation-exchange membrane without accompanied by an increase in the membrane voltage.
[Means for Solution]
A bipolar membrane comprising a cation-exchange membrane and an anion-exchange membrane joined together facing each other, wherein at least one of the ion exchange membranes contains a chlorinated polyolefin.

8 Claims, No Drawings

BIPOLAR MEMBRANE AND METHOD OF MANUFACTURING THE SAME

TECHNICAL FIELD

This invention relates to a bipolar membrane comprising a cation-exchange membrane and an anion-exchange membrane joined together facing each other, and to a method of manufacturing the same. More specifically, the invention relates to a bipolar membrane featuring adhesion or greatly improved peeling resistance between the cation-exchange membrane and the anion-exchange membrane, and to a method of manufacturing the same.

BACKGROUND ART

The bipolar membrane is a composite membrane in which a cation-exchange membrane and an anion-exchange membrane are stuck together, and has a function for splitting water into protons and hydroxide ions.

By utilizing this special function, the bipolar membrane is incorporated in an electric dialyzing apparatus together with the cation-exchange membrane and/or the anion-exchange membrane. Upon conducting the electrodialysis, an acid and an alkali can be produced from a neutral salt. Therefore, a variety of applications have been proposed (non-patent document 1).

The above bipolar membrane requires a high degree of adhesion particularly between the cation-exchange membrane and the anion-exchange membrane, and it has been desired that the membranes are effectively prevented from being swollen even after the membranes are used, for example, for the electrodialysis for extended periods of time and that the electrodialysis is stably conducted without permitting the membranes to be peeled off. Therefore, a variety of manufacturing methods have been proposed.

For example, patent document 1 proposes a method of sticking a cation-exchange membrane and an anion-exchange membrane together using a mixture of polyethyleneimine and epichlorohydrin and adhering them together by curing.

Patent document 2 proposes a method of adhering a cation-exchange membrane and an anion-exchange membrane together using an ion exchange adhesive.

Patent document 3 proposes a method of applying a fine powdery ion-exchange resin (a paste-like mixture of an anion- or cation-exchange resin and a thermoplastic material) onto a cation-exchange membrane or an anion-exchange membrane, and press-adhering them together.

Patent document 4 proposes a method of production by applying a paste-like material comprising a vinylpyridine and an epoxy compound onto the surface of a cation-exchange membrane followed by the irradiation with radiant rays.

Patent document 5 proposes a method of applying a sulfonic acid-type high molecular electrolyte and allylamines onto the surface of an anion-exchange membrane, and effecting the crosslinking by the irradiation with ionizing radiant rays.

However, though the adhesion of these membranes was improved, the bipolar voltage was so high that they were not industrially useful. The bipolar voltage (V) is expressed by the sum of a water splitting voltage (V') required for splitting water in the interface between the cation-exchange resin layer and the anion-exchange resin layer constituting the bipolar membrane and potential differences ($V_C$, $V_A$) occurring in relation to the electric resistances of the layers. The theoretical voltage of the water splitting voltage V' is about 0.83 V, and attempts have been made to lower the bipolar voltage by bringing the water splitting voltage V' that constitutes the bipolar voltage as close to the theoretical voltage as possible. The attempts are to place a chemical material having a catalytic function chiefly for accelerating the splitting of water in the interface between the two layers where the splitting of water takes place, and have contributed to lowering the bipolar voltage.

For example, non-patent document 2 and patent document 6 disclose making heavy metal ions present in the interface of the two layers.

Non-patent document 3 discloses forming a layer having a tertiary pyridine as an intermediate layer between the two layers.

Further, patent document 7 and non-patent document 3 disclose making an inorganic ion-exchanger present in the interface between the two layers

PRIOR ART DOCUMENTS

Patent Documents

Patent document 1: JP-B-32-3962
Patent document 2: JP-B-34-3961
Patent document 3: JP-B-35-14531
Patent document 4: JP-B-38-16633
Patent document 5: JP-B 51-41113
Patent document 6: JP-A-4-228591
Patent document 7: JP-A-7-258878
Patent document 8: JP-A-7-222915

Non-Patent Documents

Non-patent document 1: Journal of Membrane Science, 61 (1991) 239-252
Non-patent document 2: Journal of Membrane Sci., 78 (1993), 13-23
Non-patent document 3: Desalination, 68 (1988), 279-292

OUTLINE OF THE INVENTION

Problems that the Invention is to Solve

Owing to the technology for improving membranes as described above, it has now been made possible to prepare a bipolar membrane having a low bipolar voltage, and some processes have now been placed in practical use. However, the adhesion of the anion-exchange membrane and the cation-exchange membrane is not still sufficient, and a further improvement has been desired. Further, from the standpoint of manufacturing cost, the conventional bipolar membranes are not still satisfactory, and it has been urged to provide an easy and inexpensive manufacturing method.

At present, further, it has been desired to efficiently produce acids and alkalis on a practical and industrial scale. For instance, acids and alkalis have been produced by executing the electrodialysis under high-temperature conditions. However, the conventional bipolar membranes have a low resistance against the heat and if the electrodialysis is executed under high-temperature conditions, the membranes tend to be easily peeled off posing a problem in that the conditions for the electrodialysis are limited to low temperatures.

It is, therefore, an object of the present invention to provide a bipolar membrane featuring improved adhesion between an anion-exchange membrane and a cation-exchange membrane without accompanied by an increase in the membrane voltage.

Another object of the present invention is to provide a method of manufacturing a bipolar membrane, which is capable of easily and inexpensively manufacturing the above bipolar membrane.

A further object of the present invention is to provide a bipolar membrane which has excellent heat resistance, maintains high degree of adhesion even when the electrodialysis is executed under high-temperature conditions, and is capable of stably executing the electrodialysis without permitting membranes to be peeled off, and to a method of manufacturing the same.

Means for Solving the Problems

According to the present invention, there is provided a bipolar membrane comprising a cation-exchange membrane and an anion-exchange membrane joined together facing each other, wherein at least one of the ion-exchange membranes contains a chlorinated polyolefin.

In the bipolar membrane of the present invention, it is desired that:
1. The chlorine content in the chlorinated polyolefin is in a range of 20 to 80% by weight;
2. The ion-exchange membrane containing the chlorinated polyolefin has a reinforcing material;
3. The reinforcing material is a resin having a softening point of not lower than 70° C.; and
4. The chlorinated polyolefin is contained in the anion-exchange membrane or the cation-exchange membrane in an amount of 0.01 to 50% by weight.

According to the present invention, further, there is provided a method of manufacturing a bipolar membrane comprising:

polymerizing and curing a polymerizable solution obtained by dissolving, in an organic solvent, a polymerizable and curable component for forming an ion-exchange resin and a chlorinated polyolefin to thereby prepare an ion-exchange membrane containing the chlorinated polyolefin;

applying, onto a surface of the ion-exchange membrane, a polar organic solvent solution of a counter ion-exchange resin having an opposite electric charge or a polar organic solvent solution of a counter ion-exchange resin precursor having a reaction group capable of introducing a counter ion-exchange group; and removing the polar organic solvent to form a counter ion-exchange membrane or a counter ion-exchange resin precursor membrane on the surface of the ion-exchange membrane, and introducing counter ions into the counter ion-exchange resin precursor if the counter ion-exchange resin precursor membrane is to be formed.

In the manufacturing method of the present invention, it is desired that:
1. The polymerizable and curable component is the one for forming the cation-exchange resin;
2. The polymerizable solution contains a polyolefin powder as a viscosity-imparting agent; and
3. The chlorinated polyolefin is added to the counter ion-exchange membrane.

Effects of the Invention

In the bipolar membrane of the present invention, an important feature resides in that at least either one of the cation-exchange membrane or the anion-exchange membrane is blended with the chlorinated polyolefin. Upon being blended with the chlorinated polyolefin, the adhesion or the peeling resistance is greatly improved between the cation-exchange membrane and the anion-exchange membrane.

That is, the bipolar membrane of the present invention is such that either one of the cation-exchange membrane or the anion-exchange membrane serves as an ion-exchange substratum membrane, one surface of the ion-exchange substratum membrane is coated with a solution for forming a counter ion-exchange membrane, and the solvent is removed from the coating to thereby form the counter ion-exchange membrane. Here, the chlorinated polyolefin exhibits a high degree of affinity to the monomer component (e.g., styrene, divinylbenzene, various amines, etc.) used for forming, for example, the ion-exchange substratum membrane and to the ion-exchange resin and, further, exhibits a high degree of compatibility to various polar solvents. It will, therefore, be understood that either when the ion-exchange substratum membrane or when the counter ion-exchange membrane is blended therewith, a structure is formed in which high molecular chains (particularly, amorphous portions) thereof are entangled with the high molecular chains of the ion-exchange resin and are little split off the exchange resin. Besides, when the counter ion-exchange membrane is being formed, the chlorinated polyolefin present in the ion-exchange substratum membrane partly migrates into the coating solution due to the polar solvent contained in the coating solution or the chlorinated polyolefin in the coating solution infiltrates into the ion-exchange substratum membrane together with the polar solvent. Therefore, the chlorinated polyolefin is made present in the interface between the ion-exchange substratum membrane and the counter ion-exchange membrane in a manner of being entangled with both membranes. As a result, a high anchoring effect is exhibited by the chlorinated polyolefin, and the adhesion of the two membranes is greatly improved.

Further, use of the chlorinated polyolefin eliminates the need of providing any particular adhesive layer in the interface between the ion-exchange substratum membrane and the counter ion-exchange membrane. Therefore, there is no increase in the membrane voltage of the bipolar membrane.

According to the present invention, further, the heat resistance of the bipolar membrane is improved by using the chlorinated polyolefin that contains chlorine of a high softening point in an amount of 20 to 80% by weight making it possible to maintain a high degree of adhesion even under high-temperature conditions. Even when applied to the electrodialysis under high-temperature conditions, therefore, the membranes are not peeled off, and the electrodialysis can be executed for extended periods of time maintaining stability. That is, the chlorinated polyolefin does not swell even when it is dipped in an acidic aqueous solution or in an alkaline aqueous solution. As a result, use of the chlorinated polyolefin having a high softening point helps effectively prevent the membranes from being peeled off under high-temperature conditions.

For example, when a vinyl chloride resin is used in place of the chlorinated polyolefin, a high degree of adhesion cannot be maintained because of its low softening point and easily swelling property. Besides, the membranes are loosened due to swelling whereby the bipolar membrane exhibits very decreased property for selectively permeating ions; i.e., properties of the bipolar membrane are greatly deteriorated.

Mode for Carrying Out the Invention

As described above, the bipolar membrane of the present invention is manufactured by using the cation-exchange membrane or the anion-exchange membrane as the ion-exchange substratum membrane, coating one surface of the ion-exchange substratum membrane with a coating solution for forming the counter ion-exchange membrane, and removing the solvent from the coating thereby forming the counter ion-exchange membrane. Here, at least either one of the ion-exchange substratum membrane or the counter ion-exchange membrane is blended with the chlorinated polyolefin. For instance, the cation-exchange membrane in the bipolar membrane may be blended with the chlorinated polyolefin or the anion-exchange membrane may be blended with the chlorinated polyolefin. Or, both the cation-exchange membrane and the anion-exchange membrane may be blended with the chlorinated polyolefin.

<Chlorinated Polyolefin>

The chlorinated polyolefin used in the present invention is obtained by chlorinating a homopolymer or a copolymer of various polyolefins, e.g., α-olefins such as ethylene, propylene, 1-butene, 1-pentene, 1-hexene, 3-methyl-1-butene, 4-methyl-1-pentene and 5-methyl-1-heptene. Particularly preferably, the chlorinated polyolefin is obtained by chlorinating a polyethylene from the standpoint of cost, etc.

The content of chlorine in the chlorinated polyolefin is, preferably, in a range of 20 to 80% by weight and, particularly, 40 to 75% by weight. When the content of chlorine is in this range, a high degree of affinity is exhibited to the polar solvent to advantageously work in the mechanism of adhesion.

From the standpoint of heat resistance, further, a high softening point (e.g., moer than 140° C., particularly, not lower than 150° C. and, further preferably, not lower than 170° C.) is preferred. When the above range is satisfied, a high degree of adhesion is maintained even under high-temperature conditions and a bipolar voltage remains low. Even when subjected to the electrodialysis under high-temperature conditions, therefore, the membranes are not peeled off, and the electrodialysis can be conducted maintaining stability.

Though there is no particular limitation on the molecular weight of the chlorinated polyolefin that is used, it is, usually, desired that it has a number average molecular weight calculated as that of polystyrene of not less than 50,000 and, particularly, not less than 100,000. That is, the longer the molecular chain of the chlorinated polyolefin, the larger the degree of its entanglement with the molecules of the ion-exchange resin and the like. Therefore, a high degree of adhesion is realized, and a bipolar membrane of a low bipolar voltage is obtained.

In the bipolar membrane of the present invention, the chlorinated polyolefin may be contained in either the ion-exchange substratum membrane or the counter ion-exchange membrane, or may be contained in both of these membranes. In any one of these forms, however, it is desired that the chlorinated polyolefin is contained in an amount of 0.01 to 50% by weight and, particularly, 0.1 to 10% by weight in the anion-exchange membrane or the cation-exchange membrane. If the amount of the chlorinated polyolefin is smaller than the above range, the adhesion decreases between the ion-exchange substratum membrane and the counter ion-exchange membrane. If used in amounts larger than the above range, on the other hand, the ion-exchange performance decreases causing inconvenience such as an increase in the membrane voltage.

<Preparation of the Ion-Exchange Substratum Membrane>

In the present invention, a known cation-exchange membrane or anion-exchange membrane can be used as an ion-exchange substratum membrane. In order for the membrane to maintain a predetermined strength, however, it is desired that the ion-exchange substratum membrane contains a reinforcing material. As such a reinforcing material, any material can be used so far as a predetermined strength is obtained. From the standpoint of heat resistance, in particular, it is desired to use a high molecular material having a softening point of not lower than 70° C. and, most desirably, a high molecular material which maintains good durability even when used under severe conditions where it comes in contact with acids and alkalis. As such a high molecular material, there can be exemplified aromatic condensed high molecular materials such as polyetheretherketone, polysulfone, polyethersulfone, polyimide and polyetherimide, polyolefines such as polyethylene and polypropylene, and fluorine-contained resins. The reinforcing material may assume any form such as woven fabric, nonwoven fabric, porous film, etc. From the standpoint of the strength, however, the woven fabric is desired.

The ion-exchange resin that serves as a skeleton of the cation-exchange membrane or the anion-exchange membrane is a known one which comprises, for example, a hydrocarbon type or fluorine type substratum resin into which cation-exchange groups or anion-exchange groups are introduced. As the hydrocarbon type substratum resin, there can be exemplified styrene resin and acrylic resin. As the fluorine type substratum resin, there can be exemplified perfluorocarbon resin, etc.

Further, there is no particular limitation on the ion-exchange groups introduced into the substratum resin provided they are functional groups capable of turning into a negative or positive electric charge in the aqueous solution. As the cation-exchange group, there can be exemplified sulfonic acid group, carboxylic acid group and phosphonic acid group. Usually, the sulfonic acid group which is a strong acid group is desired. As the anion-exchange group, further, there can be exemplified primary to tertiary amino groups, quaternary ammonium group, pyridyl group, imidazole group and quaternary pyridinium group. Usually, the quaternary ammonium group and the quaternary pyrdinium group which are strong basic groups are desired.

Though there is no particular limitation on the method of molding the above ion-exchange membranes, there can be exemplified the following method as a representative method. That is, a woven fabric such as of polyolefin is impregnated, by imbibition, spraying or coating, with a monomer composition containing a monomer having ion-exchange groups, a crosslinking monomer (e.g., divinylbenzene, etc.) and a polymerization initiator. Thereafter, the monomer composition is polymerized to form an ion-exchange resin thereby to obtain a desired exchange substratum membrane.

Further, when a monomer having a functional group capable of introducing the ion-exchange group is used as the above monomer, the polymerization is conducted in the same manner as above to form a precursor of the ion-exchange resin. If the cation-exchange membrane is to be formed, desired ion-exchange groups are introduced into the precursor by such a treatment as sulfonation, chlorosulfonation, phosphonation or hydrolysis. If the anion-exchange membrane is to be formed, desired ion-exchange groups are introduced into the precursor by such a treatment as amination or alkylation to obtain the desired ion-exchange substratum membrane.

In the invention, further, when the ion-exchange substratum membrane is to be blended with the chlorinated polyolefin, the above monomer composition (or a solvent solution of a high molecular material containing ion-exchange groups) may be blended with the chlorinated polyolefin in an amount mentioned above.

As required, further, the above monomer composition or the solvent solution of the high molecular material containing ion-exchange groups is, desirably, blended with a polyolefin powder (e.g., a polyethylene powder) as a viscosity-imparting agent. That is, use of the polyolefin powder makes it possible to adjust the viscosity to lie in a range in which dripping is effectively prevented at the time of the operation for forming membranes. Besides, the polyolefin has good compatibility to the chlorinated polyolefin, and a larger membrane strength and better dimensional stability can be obtained. It is desired that the average particle size of the polyolefin powder is, usually, in a range of not larger than 10 µm as measured by the laser diffraction/scattering method from the standpoint of being homogeneously dispersed in the liquid such as the monomer composition.

It is desired that the ion-exchange substratum membrane prepared as described above has a thickness in a range of 10 to 200 µm. If the thickness is too small, the strength of the ion-exchange substratum membrane may greatly decrease. If the thickness is too large, on the other hand, inconvenience occurs, such as an increase in the membrane voltage.

It is desired that the ion-exchange capacity of the ion-exchange substratum membrane is, usually, in a range of 0.1 to 4 meq/g and, particularly, 0.5 to 2.5 meq/g from the standpoint of membrane properties of the bipolar membrane, such as voltage drop, transport number, etc.

In the present invention, the counter ion-exchange membrane is formed on the ion-exchange substratum membrane. Here, however, it is desired to roughen the surface of the ion-exchange substratum membrane (surface on the side of forming the counter ion-exchange membrane) prior to forming the counter ion-exchange membrane and to adjust the arithmetic mean surface roughness Ra thereof to lie in a range of 0.1 to 2.0 µm and, particularly, 0.2 to 1.8 µm. Upon forming, on the roughened surface, the counter ion-exchange membrane having an ion-exchange group that forms a pair with the ion-exchange substratum membrane, it is allowed to enhance the close adhesion of the membranes, to increase the anchoring effect and, therefore, to obtain the bipolar membrane featuring further improved adhesion.

The arithmetic mean surface roughness Ra can be calculated by graphically processing the surface image taken by using an ultra-depth shape measuring microscope as described later in Examples.

The roughening treatment can be conducted in a customary manner. For example, the surface (junction surface) of the ion-exchange substratum membrane is polished by using a sand-paper or by blasting a hard particulate material such as sand. When an ion-exchange membrane formed by a general coating method is used as the ion-exchange substratum membrane, further, the roughened surface can also be formed by using a substratum film such as of a polyethylene terephthalate having a roughened surface formed as described above at the time of preparing the ion-exchange membrane, and peeling off the substratum film after the ion-exchange membrane on the substratum film.

The ion-exchange substratum membrane having the roughened surface formed as described above is dried and, thereafter, the counter ion-exchange membrane is formed thereon.

<Forming the Counter Ion-Exchange Membrane>

In the present invention, the counter ion-exchange membrane is formed by a coating method on the ion-exchange substratum membrane that has been formed as described above.

For example, a coating solution containing the counter ion-exchange resin precursor having a reaction group capable of introducing counter ions, is applied onto the surface of the ion-exchange substratum membrane and is, next, dried to remove the solvent from the coating solution. Thereafter, counter ions are introduced into the counter ion-exchange resin precursor to obtain the bipolar membrane having the counter ion-exchange membrane formed on the ion-exchange substratum membrane.

It is also allowable to form the counter exchange resin film through one step by applying the coating solution containing the counter ion-exchange resin onto the surface of the ion-exchange substratum membrane followed by drying.

In either case, the chlorinated polyolefin can be contained in the counter ion-exchange membrane by containing the chlorinated polyolefin mentioned above in either the coating solution that contains the counter ion-exchange resin precursor or the coating solution that contains the counter ion-exchange resin.

The counter ion-exchange membrane is, usually, formed through a two-step process. Namely, the coating solution containing the high molecular counter ion-exchange resin precursor having a reaction group capable of introducing the counter ion-exchange group, is applied onto the surface of the ion-exchange substratum membrane and, next, the solvent is removed to form the membrane of the precursor. Thereafter, the counter ion-exchange groups are introduced into the precursor.

As the high molecular material having the reaction group, i.e., as the counter ion-exchange resin precursor and, when the cation-exchange membrane is used as the counter ion-exchange membrane, there is preferably used a polymer having a monomer unit capable of introducing cation-exchange groups, such as styrene, vinyltoluene, vinylxylene, α-methylstyrene, vinylnaphthalene or α-halogenated styrene. When the anion-exchange membrane is used as the counter ion-exchange membrane, there is preferably used a polymer having a monomer unit capable of introducing anion-exchange groups, such as chloromethylstyrene, vinylpyridine or vinylimidazole.

As the organic solvent for forming the coating solution that contains the above precursor, there is used the one that does not affect the properties of the underlying ion-exchange substratum membrane and does not adversely affect the introduction of the ion-exchange groups. That is, there is used such a polar solvent as alcohol, ethylene chloride, tetrahydrofuran, dimethylformamide or N-methylpyrrolidone.

The concentration of the precursor in the coating solution may be suitably set by taking the coating property into consideration. Further, when the coating solution is blended with the chlorinated polyolefin, the amount thereof may be so set that the amount of the chlorinated polyolefin in the counter ion-exchange membrane that is finally formed lies in the range mentioned above.

The coating formed by the coating solution is dried and, as required, introduce the ion-exchange groups. That is, when the cation-exchange membrane is formed as the counter ion-exchange membrane, the ion-exchange groups are introduced by such a treatment as sulfonation, chlorosulfonation, phosphonation or hydrolysis. When the anion-exchange membrane is formed as the counter ion-exchange membrane, the ion-exchange groups are introduced by such a treatment as amination or alkylation.

It is desired that the counter ion-exchange membrane formed as described above has a thickness in a range of 1 to 200 µm. Like the ion-exchange substratum membrane, further, it is desired that the counter ion-exchange membrane has an ion exchange capacity in a range of, usually, 0.1 to 4 meq/g and, particularly, 0.5 to 2.5 meq/g from the standpoint of membrane properties of the bipolar membrane. Therefore, the coated thickness of the counter ion-exchange membrane or of the precursor membrane thereof, and the composition of the thermoplastic resin (content of the monomer unit having reaction group) for forming the precursor membrane or the amount of the compound used for introducing the ion-exchange groups, are so set as to attain the above thicknesses and the ion-exchange capacity.

According to the present invention, further, the counter ion-exchange membrane can be formed through one step without introducing the ion-exchange groups in a manner of coating the coating solution which is obtained by dissolving the ion-exchange polymer having the counter ion-exchange groups in a predetermined polar organic solvent and drying it. In this case, the chlorinated polyolefin is contained in the counter ion-exchange membrane by blending the coating solution with the chlorinated polyolefin of a predetermined amount.

According to the present invention, forming the counter ion-exchange membrane through one step as described above is desired from the standpoint of simplifying the steps of production and decreasing the cost of production. That is, when the counter ion-exchange membrane is formed by the one-step method, the counter ion-exchange resin and the counter exchange membrane are formed at one time enabling the productivity to be enhanced as compared to when the two steps are separately conducted.

After the counter ion-exchange membrane is formed on the surface of the ion-exchange substratum membrane as described above, the heat treatment is suitably conducted so that the counter ion-exchange membrane bites into the roughened surface of the ion-exchange substratum membrane. As a result, the adhesion or junction strength is markedly improved between the ion-exchange substratum membrane and the counter ion-exchange membrane.

It is desired that the heat treatment is conducted at a temperature higher, for example, than a softening point of the reinforcing material in the ion-exchange substratum membrane and under a pressed condition, such as being held between the steel plates or being passed through the rollers heated at the above temperature range.

<Bipolar Membrane>

The bipolar membrane of the present invention produced as described above has the chlorinated polyolefin contained in either the ion-exchange substratum membrane or the counter ion-exchange membrane. Therefore, the ion-exchange substratum membrane and the counter ion-exchange membrane are joined together maintaining a high degree of adhesion. When the chlorinated polyolefin having a predetermined chlorine content is used, in particular, excellent heat resistance is realized. Even when used for the electrodialysis under high-temperature conditions, therefore, the membranes are not peeled off, and the electrodialysis can be conducted for extended periods of time maintaining stability. Therefore, a wide range of production conditions can be employed particularly for producing acids and alkalis.

In the present invention, further, the chlorinated polyolefin is contained in either the ion-exchange substratum membrane or the counter ion-exchange membrane. Basically, however, it is desired that the chlorinated polyolefin is contained in the ion-exchange substratum membrane to attain a higher degree of adhesion. That is, a crosslinked structure is, usually, introduced in the ion-exchange substratum membrane from the standpoint of increasing the strength. When the chlorinated polyolefin is contained in the coating solution for forming the counter ion-exchange membrane, therefore, limitation is imposed on the infiltration of the chlorinated polyolefin into the ion-exchange substratum membrane. When the chlorinated polyolefin is contained in the ion-exchange substratum membrane, on the other hand, the chlorinated polyolefin present in the ion-exchange substratum membrane is extracted by the polar organic solvent contained in the coating solution at the time of forming the counter ion-exchange membrane and is allowed to effectively and reliably migrate toward the counter ion-exchange membrane (specifically, into the interface between the two membranes) reliably realizing a high degree of adhesion.

Further, the chlorinated polyolefin used in the invention has a very high affinity to the monomer component such as styrene and to the crosslinking component such as divinylbenzene. It is, therefore, desired that the chlorinated polyolefin is contained in the cation-exchange membrane and, particularly, in the cation-exchange membrane having a cation-exchange resin obtained by sulfonating a styrene/divinylbenzene copolymer. That is, in the above cation-exchange membrane, the polymerization is conducted in a state where the chlorinated polyolefin is compatible with the monomer component and the crosslinking component. Therefore, the chlorinated polyolefin is made present in a state of being entangled with the molecular chains of the ion-exchange resin, and is effectively prevented from being separated away making it possible to realize a particularly high degree of adhesion.

Here, as required, the present invention may suitably employ a known method of lowering the bipolar voltage by introducing, into the interface between the two membranes of the bipolar membrane, heavy metal ions or a tertiary amine having a catalytic action for splitting water.

EXAMPLES

Excellent effects of the invention will now be described by way of the following Examples.

In Examples and Comparative Examples, characteristics of the bipolar membrane (bipolar voltage, adhesion) and arithmetic mean roughness (Ra) of the surface of the ion-exchange substratum membrane were measured by the methods described below.

Bipolar Voltage:

To measure the bipolar voltages of bipolar membranes (sample bipolar membranes) prepared in Examples and Comparative Examples, the following commercially available product was provided as a bipolar membrane for contrast. The bipolar membrane for contrast does not contain chlorinated polyolefin, as a matter of course.

Bipolar Membrane for Contrast:

Neoceptor BP-1E manufactured by Astom Co.

Measurement was taken by using cells for measurement of a four-chamber structure having the following specifications obtained by using the above bipolar membrane for contrast (contrast BP membrane) and the bipolar membranes (sample BP membranes) prepared in Examples and Comparative Examples.

Cells for Measurement:

Anode (Pt plate) (1 mol/L-NaOH)/contrast BP membrane/(1 mol/L-NaOH)/sample BP membrane/(1 mol/L-HCl)/contrast BP membrane/(1 mol/L-HCl) cathode (Pt plate)

By using the above cells for measurement, an electric current was flown under the conditions of a liquid temperature of 80° C. and a current density of 10 A/dm$^2$, and bipolar voltages were measured by using platinum wire electrodes installed holding the sample BP membrane.

Adhesion of the Bipolar Membranes:

The bipolar membrane was dipped in a 6N sodium hydroxide aqueous solution. After dipped at 80° C. for 1 hour, the bipolar membrane was taken out therefrom, and was dipped in pure water of 25° C. for 1 hour. After taken out from the pure water, the membrane was analyzed by using an image processing system (IP-1000PC manufactured by Asahi Engineering Co.) to calculate the ratio (%) of the normal portion (which is not blistering) in 1 cm² of the membrane. The ratio was evaluated as high-temperature adhesion.

Arithmetic mean surface roughness (Ra) of the surfaces of the ion-exchange substratum membranes:

By using an ultra-depth shape measuring microscope, VK-8500 (manufactured by Keyence Co.), the surface of the ion-exchange membrane (ion-exchange substratum membrane) was observed at a magnification of 1000 times.

The image was synthesized based on the data of light quantity and the color data of a CCD camera and, at the same time, the data representing a rugged shape of the surface were obtained. A suitable place free of impurities having a length of about 100 µm was selected, a roughness curve f(x) was found from the data of the rugged shape, and a mean roughness Ra along the center line was found from the following formula (I). The operation was repeated a several number of times to find an arithmetic mean surface roughness (Ra) of the ion-exchange substratum member after having confirmed that the errors were within ±5%.

$$Ra = 1/f \int_0^l |f(x)| dx \quad \text{[Mathematical 1]}$$

Example 1

By using a chlorinated polyethylene having a chlorine content of 68% and a molecular weight of 350,000 as an adhesive resin, a monomer composition for an ion-exchange substratum membrane was prepared according to the following recipe.

Recipe of monomer composition:

| | |
|---|---|
| Styrene: | 90 parts by weight |
| Divinylbenzene (57% product): | 10 parts by weight |
| Benzoyl peroxide (polymerization initiator): | 5 parts by weight |
| Dioctyl phthalate (plasticizer): | 10 parts by weight |
| Polyethylene powder: | 100 parts by weight |
| Chlorinated polyethylene: | 15 parts by weight |

A woven fabric (50 deniers, 200 meshes) of a polyethylene was provided as a reinforcing material. The woven fabric (reinforcing material) was dipped in the above monomer composition under atmospheric pressure at 25° C. for 10 minutes so as to be coated with the monomer composition.

As a peeling film, further, there was prepared a polyethylene terephthalate film (Teijin Tetron Film, Type S, polyethylene terephthalate, manufactured by Teijin-Dupont Co.) of a thickness of 100 µm.

The above woven fabric dipped in the monomer composition was taken out from the monomer composition, and both surfaces of the woven fabric were covered with the peeling film.

Thereafter, the woven fabric was heated in nitrogen under a pressure of 0.3 MPa at 80° C. for 5 hours to polymerize the monomer composition with which the woven fabric was impregnated to thereby obtain a polymer membrane.

The obtained polymer membrane was dipped in a mixture of sulfuric acid of a concentration of 98% and chlorosulfonic acid of a purity of not lower than 90% at 40° C. for 60 minutes to obtain a cation-exchange membrane of the sulfonic acid type.

The obtained cation-exchange membrane of the sulfonic acid type was treated for its surface by using a sand-paper to form a rugged surface on one side thereof, and an ion-exchange substratum membrane having an arithmetic mean surface roughness (Ra) of 1.2 µm was obtained.

The obtained ion-exchange substratum membrane was dipped in an aqueous solution of ferrous chloride of 2% by weight for 60 minutes, and was air-dried at room temperature.

On the other hand, a styrene and a chloromethylstyrene (mol ratio of 10:1) were copolymerized in toluene in the presence of a polymerization initiator (benzoyl peroxide) at 70° C. for 10 hours, and the reaction solution thereof was poured into methanol so that the copolymer was precipitated and separated. The chloromethyl groups of the copolymer were transformed into quaternary ammonium groups with a tetramethylethylenediamine to obtain a partly aminated polystyrene having a quaternary ammonium group-exchange capacity of 0.87 meq/g.

The above partly aminated polystyrene was dissolved in tetrahydrofuran (THF) to prepare a solution (counter ion-exchange resin solution) of a concentration of 15% by weight.

The above counter ion-exchange resin solution was applied onto the roughened surface of the ion-exchange substratum membrane that has been prepared above, and was dried at room temperature to obtain a bipolar membrane.

Bipolar properties of the membrane were as shown in Table 1.

There was no change in the bipolar voltage of the bipolar membrane even after three months have passed, and quite no blister (water bubble) has occurred in the membrane.

Examples 2 and 3

Bipolar membranes were obtained in quite the same manner as in Example 1 but changing the reinforcing material of the ion-exchange substratum membrane into those shown in Table 1. Bipolar properties of the membranes were as shown in Table 1.

There was no change in the bipolar voltages of the bipolar membranes even after three months have passed like in Example 1, and quite no blister (water bubble) has occurred in the membranes.

Example 4

By using, as an adhesive resin, the same chlorinated polyethylene as the one used in Example 1, a monomer composition for an ion-exchange substratum membrane was prepared according to the following recipe.

Recipe of Monomer Composition:

| | |
|---|---|
| Chloromethyltyrene: | 90 parts by weight |
| Divinylbenzene (57% product): | 10 parts by weight |
| Benzoyl peroxide (polymerization initiator): | 5 parts by weight |
| Polyethylene powder: | 100 parts by weight |
| Chlorinated polyethylene: | 15 parts by weight |

By using the above monomer composition, a woven fabric (50 deniers, 200 meshes) of a polyethylene as a reinforcing material was coated with the monomer composition in the same manner as in Example 1 and was, thereafter, heat-polymerized to obtain a polymer membrane.

Next, an aminating bath of the following composition was provided.

Aminating Bath:

| Trimethylamine aqueous solution (concentration of 30% by weight): | 10 parts by weight |
| Water: | 50 parts by weight |
| Acetone: | 5 parts by weight |

The above polymer membrane was dipped in the aminating bath and was reacted with a trimethylamine at room temperature for one day. The polymer membrane after reacted was, further, dipped an aqueous solution of 0.5 mol/l HCL, and was washed with ion-exchanged water 5 times to obtain an anion-exchange membrane of the quaternary ammonium type.

The obtained anion-exchange membrane of the quaternary ammonium type was treated for its surface by using a sandpaper to form a rugged surface on one side thereof, and an ion-exchange substratum membrane having an arithmetic mean surface roughness (Ra) of 1.3 μm was obtained.

The ion-exchange substratum membrane was dipped in an aqueous solution of ferrous chloride of 2% by weight for 60 minutes, and was air-dried at room temperature.

A counter ion-exchange resin solution was prepared by dissolving a sulfonated polyetheretherketone having a sulfonic acid group-exchange capacity of 1.0 meq/g at a concentration of 15% by weight in the tetrahydrofuran.

The counter ion-exchange resin solution was applied onto the roughened surface of the ion-exchange substratum membrane that has been obtained above, and was dried at room temperature to obtain a bipolar membrane. Bipolar properties of this membrane were as shown in Table 1.

There was no change in the bipolar voltage of the bipolar membrane even after three months have passed like in Example 1, and quite no blister (water bubble) has occurred in the membrane.

Examples 5 to 8

Bipolar membranes were obtained by preparing ion-exchange substratum membranes in quite the same manner as in Example 1 but changing the chlorinated polyethylene in the adhesive resin into those shown in Table 1. Bipolar properties of the membranes were as shown in Table 1.

There was no change in the bipolar voltages of the bipolar membranes even after three months have passed like in Example 1, and quite no blister (water bubble) has occurred in the membranes.

Comparative Example 1

A bipolar membrane was obtained by preparing the ion-exchange substratum membrane in quite the same manner as in Example 1 but changing the chlorinated polyethylene in the adhesive resin into a polyvinyl chloride (PVC) shown in Table 1. Bipolar properties of the membrane were as shown in Table 1.

The bipolar membrane was blistered while the bipolar voltage was being measured. Therefore, the bipolar voltage was as high as 3.7 V. In the adhesion test, too, the bipolar membrane was blistered (water bubbles were formed).

Comparative Example 2

A bipolar membrane was obtained by preparing the ion-exchange substratum membrane in quite the same manner as in Example 1 but without at all using the chlorinated polyethylene in the adhesive resin. Bipolar properties of the membrane were as shown in Table 1.

The bipolar membrane was blistered while the bipolar voltage was being measured. Therefore, the bipolar voltage was as high as 5.2 V. In the adhesion test, too, the bipolar membrane was blistered (water bubbles were formed).

TABLE 1

| | Adhesive resin *1 | Chlorine content (%) | Softening point (° C.) | Average molecular weight | CPO content in the exchange substratum membrane, wt % |
|---|---|---|---|---|---|
| Ex. 1 | CPE | 68 | 180 | 350000 | 4 |
| Ex. 2 | CPE | 68 | 180 | 350000 | 3 |
| Ex. 3 | CPE | 68 | 180 | 350000 | 3 |
| Ex. 4 | CPE | 68 | 180 | 350000 | 5 |
| Ex. 5 | CPP | 67 | 200 | 150000 | 4 |
| Ex. 6 | CPE | 22 | 90 | 60000 | 4 |
| Ex. 7 | CPE | 39 | 90 | 100000 | 4 |
| Ex. 8 | CPE | 70 | 140 | 20000 | 4 |
| Comp. Ex. 1 | PVC | — | 68 | 70000 | 2 |
| Comp. Ex. 2 | none | — | — | — | — |

| | Reinforcing material | High-temp. adhesion (%) | Bipolar voltage (V) |
|---|---|---|---|
| Ex. 1 | PE woven fabric (50 deniers, 200 meshes) | 100 | 1.2 |
| Ex. 2 | PP woven fabric (50 deniers) | 100 | 1.2 |
| Ex. 3 | PE porous film (15 μ, voidage 42%) | 100 | 1.1 |
| Ex. 4 | PE woven fabric (50 deniers, 200 meshes) | 100 | 1.3 |
| Ex. 5 | PE woven fabric (50 deniers, 200 meshes) | 100 | 1.3 |
| Ex. 6 | PE woven fabric (50 deniers, 200 meshes) | 92 | 1.6 |
| Ex. 7 | PE woven fabric (50 deniers, 200 meshes) | 96 | 1.5 |
| Ex. 8 | PE woven fabric (50 deniers, 200 meshes) | 87 | 1.7 |
| Comp. Ex. 1 | PE woven fabric (50 deniers, 200 meshes) | 30 | 3.7 |
| Comp. Ex. 2 | PE woven fabric (50 deniers, 200 meshes) | 0 | 5.2 |

*1 CPE: chlorinated polyethylene,
CPP: chlorinated polypropylene
PVC: polyvinyl chloride,
CPO: chlorinated polyolefin Example 9

A chlorinated polyethylene (chlorine content of 68%, molecular weight of 350000) was added (concentration of 1% by weight) to the counter ion-exchange resin solution (THF solution containing the partly aminated polystyrene at a concentration of 15% by weight) prepared in Example 1.

A bipolar membrane was obtained in the same manner as in Example 1 but using the counter ion-exchange resin solution to which the chlorinated polyethylene has been added as described above.

The membrane was evaluated for its bipolar properties in the same manner as in Example 1 to obtain such favorable results as a bipolar voltage of 1.3 V and a high-temperature adhesion of 100%.

There was no change in the bipolar voltage of the bipolar membrane even after three months have passed, and quite no blister (water bubble) has occurred in the membrane.

The invention claimed is:

1. A bipolar membrane comprising a cation-exchange membrane and an anion-exchange membrane joined together facing each other,
   wherein at least one of said ion-exchange membranes contains from 0.01% by weight to 50% by weight of a chlorinated polyolefin.

2. The bipolar membrane according to claim 1, wherein the chlorine content in said chlorinated polyolefin is in a range of 20 to 80% by weight.

3. The bipolar membrane according to claim 1, wherein the ion-exchange membrane containing said chlorinated polyolefin has a reinforcing material.

4. The bipolar membrane according to claim 3, wherein said reinforcing material is a resin having a softening point of not lower than 70° C.

5. A method of manufacturing a bipolar membrane according to claim 1, said method comprising:
   polymerizing and curing a polymerizable solution obtained by dissolving, in an organic solvent, a polymerizable and curable component for forming an ion-exchange resin and a chlorinated polyolefin to thereby prepare an ion-exchange membrane containing the chlorinated polyolefin;
   applying, onto a surface of said ion-exchange membrane, a polar organic solvent solution of a counter ion-exchange resin having an opposite electric charge or a polar organic solvent solution of a counter ion-exchange resin precursor having a reaction group capable of introducing a counter ion-exchange group; and
   removing the polar organic solvent to form a counter ion-exchange membrane or a counter ion-exchange resin precursor membrane on the surface of said ion-exchange membrane, and
   introducing counter ions into the counter ion-exchange resin precursor if the counter ion-exchange resin precursor membrane is to be formed.

6. The method of manufacturing a bipolar membrane according to claim 5, wherein said polymerizable solution is used for forming a cation-exchange resin.

7. The method of manufacturing a bipolar membrane according to claim 5, wherein said polymerizable solution contains a polyolefin powder as a viscosity-imparting agent.

8. The method of manufacturing a bipolar membrane according to claim 5, wherein the chlorinated polyolefin is added to the polar organic solvent solution of said counter ion-exchange resin or to the polar organic solvent solution of the counter ion-exchange resin precursor.

* * * * *